(12) United States Patent
Rosenfeld et al.

(10) Patent No.: US 9,377,950 B2
(45) Date of Patent: Jun. 28, 2016

(54) TOUCH-BASED ANNOTATION SYSTEM WITH TEMPORARY MODES

(75) Inventors: Daniel Allen Rosenfeld, San Francisco, CA (US); Walter Hsiao, Sunnyvale, CA (US)

(73) Assignee: PERCEPTIVE PIXEL, INC., Redmond, WA (US)

( * ) Notice: Subject to any disclaimer, the term of this patent is extended or adjusted under 35 U.S.C. 154(b) by 310 days.

(21) Appl. No.: 13/287,017

(22) Filed: Nov. 1, 2011

(65) Prior Publication Data

US 2012/0110431 A1    May 3, 2012

Related U.S. Application Data

(60) Provisional application No. 61/409,508, filed on Nov. 2, 2010.

(51) Int. Cl.
| G06F 17/20 | (2006.01) |
| G06F 3/0488 | (2013.01) |
| G06F 17/24 | (2006.01) |

(52) U.S. Cl.
CPC ........ *G06F 3/04886* (2013.01); *G06F 3/04883* (2013.01); *G06F 17/241* (2013.01)

(58) Field of Classification Search
CPC .................................................... G06F 17/241
USPC ................... 715/863, 764, 810, 828; 345/173
See application file for complete search history.

(56) References Cited

U.S. PATENT DOCUMENTS

| 5,936,614 A * | 8/1999 | An ...................... G06F 3/04886 345/173 |
| 7,088,340 B2 * | 8/2006 | Kato .................. G06F 3/04886 345/168 |
| 7,483,057 B2 * | 1/2009 | Grosvenor et al. ........ 348/211.9 |
| 7,665,041 B2 * | 2/2010 | Wilson et al. ................. 715/860 |
| 7,728,821 B2 * | 6/2010 | Hillis et al. .................... 345/173 |
| 8,169,421 B2 * | 5/2012 | Wright .................... G06F 3/044 178/18.03 |
| 8,869,062 B1 * | 10/2014 | Voorhees .............. G06F 3/0485 715/784 |
| 9,147,275 B1 * | 9/2015 | Hyde-Moyer .......... G06T 11/60 |
| 2003/0080946 A1 * | 5/2003 | Chuang ......................... 345/173 |
| 2003/0095113 A1 * | 5/2003 | Ma et al. ....................... 345/175 |
| 2005/0099407 A1 * | 5/2005 | Pennington et al. .......... 345/179 |
| 2008/0120577 A1 * | 5/2008 | Ma et al. ....................... 715/863 |
| 2008/0178126 A1 * | 7/2008 | Beeck ..................... G06F 3/017 715/863 |
| 2008/0235627 A1 * | 9/2008 | Torning et al. ................ 715/841 |
| 2009/0153494 A1 * | 6/2009 | Laundroche ............ F24C 7/086 345/173 |
| 2010/0058201 A1 * | 3/2010 | Harvey et al. ................. 715/753 |
| 2010/0083111 A1 * | 4/2010 | de los Reyes ................ 715/702 |
| 2010/0185933 A1 * | 7/2010 | Coffman et al. ............. 715/230 |
| 2010/0185966 A1 * | 7/2010 | Jette et al. ..................... 715/768 |
| 2010/0201634 A1 * | 8/2010 | Coddington .................. 345/173 |
| 2010/0295799 A1 * | 11/2010 | Nicholson ............ G06F 1/1626 345/173 |

(Continued)

*Primary Examiner* — Mohammed-Ibrahim Zuberi
(74) *Attorney, Agent, or Firm* — Brandon Roper; Judy Yee; Micky Minhas

(57) ABSTRACT

One embodiment provides a system for processing gesture inputs on a touch screen display. The system receives a gesture input on the touch screen display. When the gesture is recognized as invoking an annotation canvas, the system determines the height, width and location of an annotation canvas, and displays the annotation canvas on the touch screen display. Then, in response to an input gesture within the annotation canvas, the system recognizes the gesture as an annotation gesture, and executes the annotation gesture. In response to receiving an input gesture outside of the annotation canvas, the gesture is interpreted by the system as a navigation input.

12 Claims, 4 Drawing Sheets

(56) References Cited

U.S. PATENT DOCUMENTS

| | | | |
|---|---|---|---|
| 2010/0325527 A1* | 12/2010 | Estrada et al. | 715/230 |
| 2011/0029864 A1* | 2/2011 | Stewart | G06F 3/04883 715/702 |
| 2011/0040754 A1* | 2/2011 | Peto | G06F 17/218 707/736 |
| 2011/0074710 A1* | 3/2011 | Weeldreyer et al. | 345/173 |
| 2011/0090255 A1* | 4/2011 | Wilson et al. | 345/647 |
| 2011/0320978 A1* | 12/2011 | Horodezky et al. | 715/823 |
| 2012/0110431 A1* | 5/2012 | Rosenfeld | G06F 3/04886 715/230 |
| 2012/0192108 A1* | 7/2012 | Kolb | 715/810 |
| 2012/0192117 A1* | 7/2012 | Migos et al. | 715/863 |
| 2012/0223945 A1* | 9/2012 | Ernvik et al. | 345/424 |
| 2012/0235912 A1* | 9/2012 | Laubach | G06F 3/04895 345/163 |
| 2012/0278428 A1* | 11/2012 | Harrison | H04N 21/25891 709/217 |
| 2012/0278725 A1* | 11/2012 | Gordon | H04N 21/2665 715/738 |
| 2013/0009890 A1* | 1/2013 | Kwon | 345/173 |
| 2013/0076671 A1* | 3/2013 | Kwon | 345/173 |
| 2013/0141517 A1* | 6/2013 | Shen | H04N 7/15 348/14.03 |
| 2014/0040819 A1* | 2/2014 | Duffy | G06F 9/4443 715/789 |
| 2014/0164984 A1* | 6/2014 | Farouki | 715/784 |
| 2014/0210729 A1* | 7/2014 | Chattopadhyay | G06F 3/0416 345/173 |
| 2014/0306897 A1* | 10/2014 | Cueto | G06F 3/04883 345/173 |
| 2015/0169219 A1* | 6/2015 | Koenig | G06F 3/04886 715/773 |

* cited by examiner

TOUCH-BASED ANNOTATION SYSTEM WITH TEMPORARY MODES

CROSS-REFERENCE TO RELATED APPLICATION

This application claims the benefit of U.S. provisional patent application Ser. No. 61/409,508 for "A Touch-Based Annotation System with Temporary Modes," filed Nov. 2, 2010, the disclosure of which application is incorporated herein by reference.

FIELD OF THE INVENTION

The present invention is related to touch-based display systems, and more particularly to systems, methods, and computer program products for receiving annotations on a touch screen display, and that allow multiple users to make annotations simultaneously.

BACKGROUND OF THE INVENTION

Many software application programs for touch screen displays include both a means of moving ("navigation") around a graphically represented space on the display and a means of creating annotations upon that display. These annotations can include, but are not limited to, freehand drawings, geometric shapes such as rectangles and circles, pre-defined images such as icons or symbols, and text.

An example of such a program is the Perceptive Pixel Mapboard application. Mapboard allows users to navigate rapidly through maps with panning and zooming operations. These operations are controlled through touch gestures that the user performs on a touch screen. Mapboard also enables users to draw freehand annotations which appear as if on the map, and which move and scale as the map is manipulated.

Some prior designs with persistent modes use a graphical button that allows users to switch between distinct navigation and annotation modes: in one mode all touch input on the display is interpreted as navigational control; in the other, touches create freehand colored strokes. The application also includes colored buttons to set the color used for all annotation anywhere on the display. These modes are persistent; they remain in force until the user takes explicit action to switch modes or colors.

This design, shared by many similar applications, causes several problems. First, users must visually locate the button on the screen and move their finger to touch it. The amount of time needed to locate and touch the button may comprise a significant portion of the total time needed to perform a task using the program, especially when the tasks requires frequent switches between the modes. The severity of this problem is increased when using the program on a very large display (e.g., 80" display), since this time to reach across the display to the control buttons increase with the size of the display.

The second problem with the persistent modes design occurs in the context where multiple users are interacting with a single touch screen. Since modes, colors, currently selected tools, etc. are set globally, users may not perform different actions, or operate in different modes, simultaneously. For example, in a design using persistent modes, it's not possible for one user to draw in red while another draws in blue; likewise one user cannot use a text annotation tool while another user uses a color pen.

An alternate design, found in some programs, adopts single-use tools. Such a program usually has a default operational mode; for example, in the default mode, user input causes navigation. The user may also select a single-use tool, such as a marker or a rectangle drawing tool, for annotation by touching or clicking an on-screen icon. The program then enters a temporary mode, when a next touch or mouse-down event is interpreted as an invocation of the temporary mode. The temporary mode is maintained until the finger is raised or the mouse-button is released. Only then the program reverts to the default mode.

This design has two problems. First, many tasks will require such a tool to be used multiple times per task, requiring the single use tool be selected repeatedly. For example, if a user wanted to circle an area on the map and indicate it with a hand-drawn arrow, they would need to select the drawing tool once for each of the several strokes needed to make this annotation. The second problem is largely the same as the multi-user problem described above; multiple users cannot practically use such a system simultaneously on the same screen, unless the system has a means of associating multiple, disparate touch events with a single user. However, touch systems in general do not have this capability.

SUMMARY OF THE INVENTION

One embodiment of the present invention provides a system for processing gesture inputs on a touch screen display. The system receives a gesture input on the touch screen display. When the gesture is recognized as invoking an annotation canvas, the system determines the height, width and location of an annotation canvas, and displays the annotation canvas on the touch screen display. Then, in response to an input gesture within the annotation canvas, the system recognizes the gesture as an annotation gesture, and executes the annotation gesture. In response to receiving an input gesture outside of the annotation canvas, the gesture is interpreted by the system as a navigation input.

In a variant of the embodiment, the system displays the annotation canvas on the touch screen display so long as the user's touch is maintained on the touch screen display. In response to the user's touch being removed from the touch screen display, the system removes the annotation canvas.

In a variant of the embodiment, determining the height, width and location of the annotation canvas comprises: determining a first location on the touch screen display at which the gesture invoking the annotation canvas is received by one hand of the user; determining a second location corresponding to the location of the other hand of the user on the touch screen display; and determining the width of the annotation canvas based on distance between the first location and the second location.

In a variant of the embodiment, the system blocks the execution of a navigation input while an annotation gesture is being received and executed within the annotation canvas.

In a variant of the embodiment, the system displays on the touch screen display an annotation control panel comprising a plurality of annotation controls, wherein each annotation control configures a parameter of the annotation entered on the annotation canvas.

DETAILED DESCRIPTION

Overview

One embodiment facilitates a touch screen system to display a graphically limited region herein called an "annotation canvas," in which annotations can be created by a user. The system comprises a large touch screen, on which a graphical space is displayed. The annotation canvas is invoked by a predetermined gesture and overlaid on the graphical space. The location of the annotation canvas on the display screen is preferably in front of the user. The annotation canvas remains in functioning mode while annotations are received from the user invoking the annotation canvas. This annotation mode is only confined to the area within the annotation canvas, while gesture inputs outside any annotation canvas are interpreted as navigational or other operations.

In one embodiment, the annotation canvas persists while some or all of the fingers used in the invocation gesture are held on the screen; during this interval, touch, mouse, or stylus events that occur in the annotation canvas region create annotations, or modify annotation settings. After the user's invoking hand is removed from the screen, the canvas is closed. Alternatively, the annotation canvas may persist until a second gesture input is received within the annotation canvas indicating that the annotations are complete and the canvas can be closed. In yet another embodiment, the canvas persists after invocation for a selected time period, the duration of which can be configured by the system and the user, or learned based on device usage.

The functionality of the annotation canvas eliminates the problems associated with the prior approaches: it is compatible with multi-user screen sharing, since an annotation canvas is presented on a per-user basis in a limited area on the touch screen; it eliminates the time otherwise needed to locate and press statically positioned controls, as the functionally can be invoked wherever the user performs the invoking gesture and additional controls are locally presented within the annotation canvas; and finally, it avoids the problem of multiple-invocations per task, since it remains on the display as long as the user is performing the annotation.

User Interface for Annotation Canvas

Figure 1:
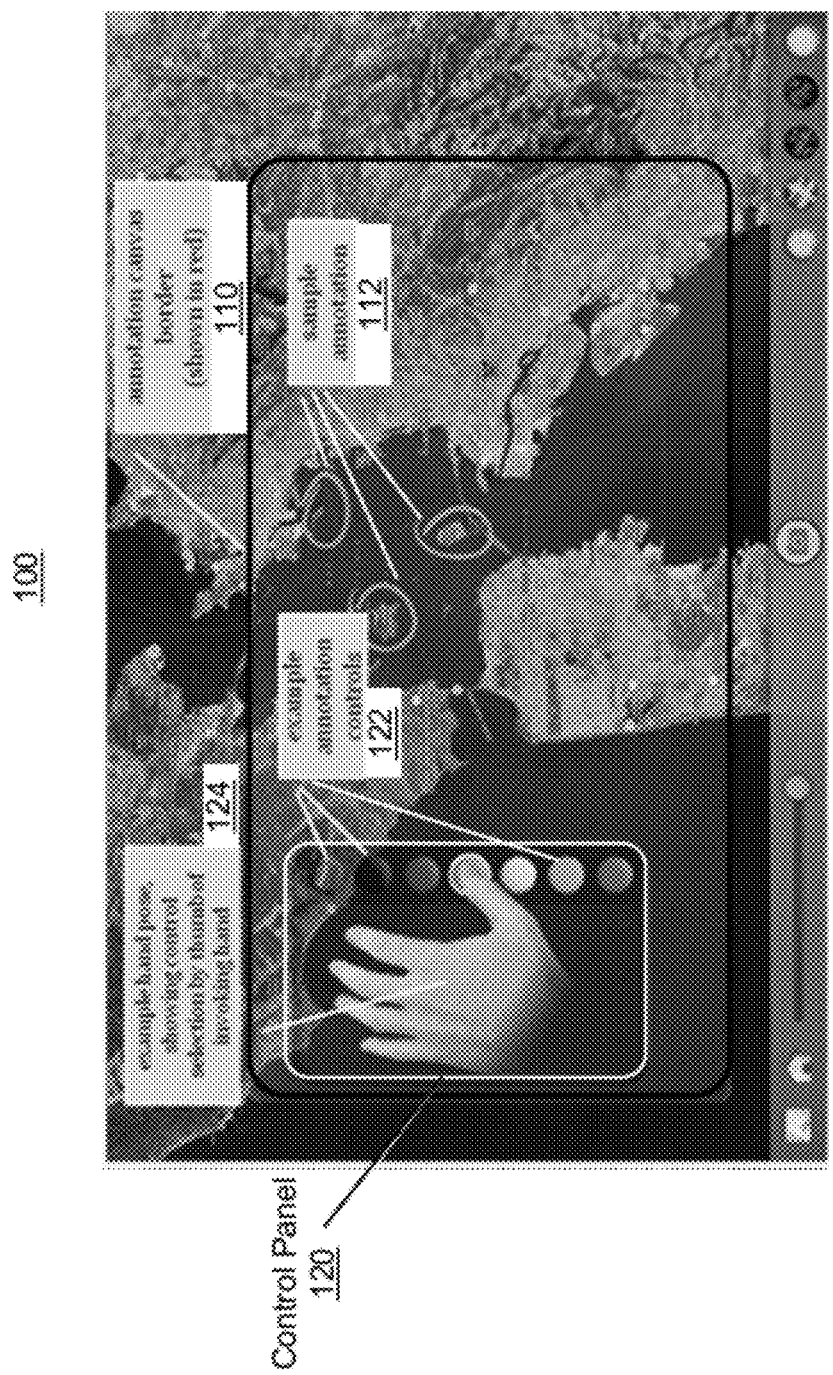
FIG. 1 illustrates an example of user interface for an application using the annotation canvas according to one embodiment of the present invention.

FIG. 1 illustrates an example user interface 100 for an application using the annotation canvas executed by the touch screen system according to one embodiment of the present invention. The application can be any type of application in which annotations are useful, such as a map application, graphics application; media design application, or the like. In addition, the application is used on touch screen display, and offers particular benefits for displays large enough for two or more people to operate at the same time. User interface 100 comprises an annotation canvas 110, a set of sample annotations 112, a control panel 120 for the annotation canvas, a set of annotation controls 122 within control panel 120. Also illustrated for context is a user's hand pose 124 to show how the user can position his or her hand over the control panel 120. Also shown is an example of a graphical space being annotated, here a map of the San Francisco Bay.

Annotation canvas 110 is outlined by a red rectangle border in FIG. 1, though other visual effects may be used to indicate the canvas area, such as a semi-transparent overlay, or both an overlay and a border line. Sample annotations 112 on the annotation canvas are shown with irregularly shaped loops. Other types of annotations can be used, including but not limited to, rectangular regions, notes, arrows, and highlighting.

In this example, the control panel 120 is shown on the left side of the annotation canvas invoked by a left hand, though the control panel 120 can be configured to appear on the right side of canvas for right hand invocations. Annotation controls 122 include color buttons for setting and changing the color of the user's annotations. These color buttons are positioned along one side of control panel 120 to allow rapid selection by the user's thumb. The user's hand pose 124 shown inside the control panel 120 performs two functions: the user's thumb sets the annotation color, and the other four fingers are positioned to hold the annotation mode of annotation canvas 110. FIG. 1 illustrates a single annotation canvas 110. However, multiple annotation canvas can co-exist on the display. These annotation canvases may be created by a single user or different users either simultaneously or at different times. Thus, multiple users can annotate at the same time.

In one embodiment, any gesture can be defined to invoke the annotation canvas, so long as the gesture is distinguishable from navigation gestures recognized by the touch screen system. The gesture should also allow one of the user's hands remain free to make annotations on the touch screen via gestures or other means. Further, different invocation gestures can be defined for different users, allowing user customizations in the operation of the annotation canvas. In case of touch gestures, it is desirable to match an invocation gesture with a specific user so that the system can determine which user invokes an annotation canvas (a use case will be described below).

Examples of invocation gestures include a four-finger tap, in which fingers close to each other from a single hand touch the screen in a roughly horizontal arrangement, as shown in the user's hand pose 124 in FIG. 1, or a five-finger tap similar to the four-finger tap, with the addition of the thumb. The invocation gestures can be either static represented by non-moving patterns of touch, or dynamic represented by patterns of moving touch. The touch screen system can also determine which of the user's hands (left or right) was used for the invocation, and the location of the other hand.

In one embodiment, an annotation canvas is initialized automatically with an area large enough to accommodate both hands of the user. The width of the annotation canvas is determined based upon the location of the invoking hands where the invocation gesture is received. More specifically, the annotation canvas is created so that it extends from the approximate location of the invocation gesture, towards the location of the user's other hand, along with sufficient area within the canvas to accommodate the control panel 120. Thus, the canvas is presented between the user's hands, and the area of the annotation canvas can be easily reached by the user's both hands. The size of the annotation therefore, is optimized for the user's convenience, and leaves enough space for other users to work at the same time.

In another embodiment, the size of the annotation canvas is preconfigured and set in the user preferences. For this embodiment, the canvas size can be specified in absolute terms, for example, by number of pixels for the height and the width, such as 600×400 pixels. The canvas size can also be defined in relative terms, such as percentages of the total screen height and width. The canvas area may be resized automatically or manually. Automatic expansion happens when user annotations approach the borders of the annotation canvas. Users can also drag any part of the border line to manually resize the canvas area. The manual resizing is useful when users attempts to add single point annotations, such as icons outside the current canvas area.

In one embodiment, the annotation canvas is created so that it extends around the approximate location of the invocation gesture. After that, the user's invoking hand can move the annotation canvas to any locations on the screen from its initial location by holding the invoking gesture and dragging the canvas to a desired direction. Alternatively, the user can use the non-invoking hand to move the underlying graphical space around to relocate the canvas using the appropriate navigation gesture. In other embodiments, a control may be displayed in the control panel to move the canvas on the touch screen.

While an annotation canvas is presented, gestures received by the touch screen are identified as being within borders of the canvas or outside thereof. Gestures within the border of the annotation canvas are interpreted as annotation inputs or annotation controls, while gestures outside of the border of the canvas are interpreted as application inputs, which include both navigation inputs (e.g., zoom, pan, translate, rotate) and other application specific inputs (e.g., non-navigation functions, such as save, open, and mode change).

Annotation Controls

When a touch gesture is used to invoke the annotation canvas, visual annotation controls can be placed close to the hand that makes the invocation gesture in an annotation control panel on the canvas. The annotation controls allow the user to configure annotation parameters, such as color and type of the annotation while making annotation either with a pointing device or simply using the other hand. The annotation controls may be implemented with buttons, sliders, toggles, palettes, additional sub-areas with multiple degrees of freedom allowing for chorded gestures and swipes, or any combination of the above.

In other embodiments, annotation controls are positioned close to the user's invoking hand. For example, as shown in FIG. 1, buttons 122 are ergonomically placed underneath the thumb of the user's invoking hand so that user may select an annotation color with an easy tapping on the color button. In contrast, another pointing device would have to travel from its current location to the desired control button to perform the same selection. An annotation control panel with one or more controls can also be positioned close to the user's non-invoking hand in another embodiment. The designation of which hand (invoking, non-invoking, or both) is provided with the annotation control panel can be set as a user preference, along with the selection of which annotation controls are included in the control panel.

In a multi-user environment, a situation may arise when one user navigates the graphical space while another user creates an annotation canvas on the same graphical space. This may cause the annotation canvas to shift position or dislocate with respect to the graphical space when the navigating user moves around the graphical space. To prevent such a conflict, navigation inputs directed to the underlying space are prohibited during an annotation action, which is essentially a navigation lock during the annotation. The navigation lock needs to be turned on only for the duration of a single annotation gesture, such as a loop stroke 112 on the canvas shown in FIG. 1. In other embodiment, annotation locks can be extended to more general input, not just navigation gestures.

System Components

Figure 2:
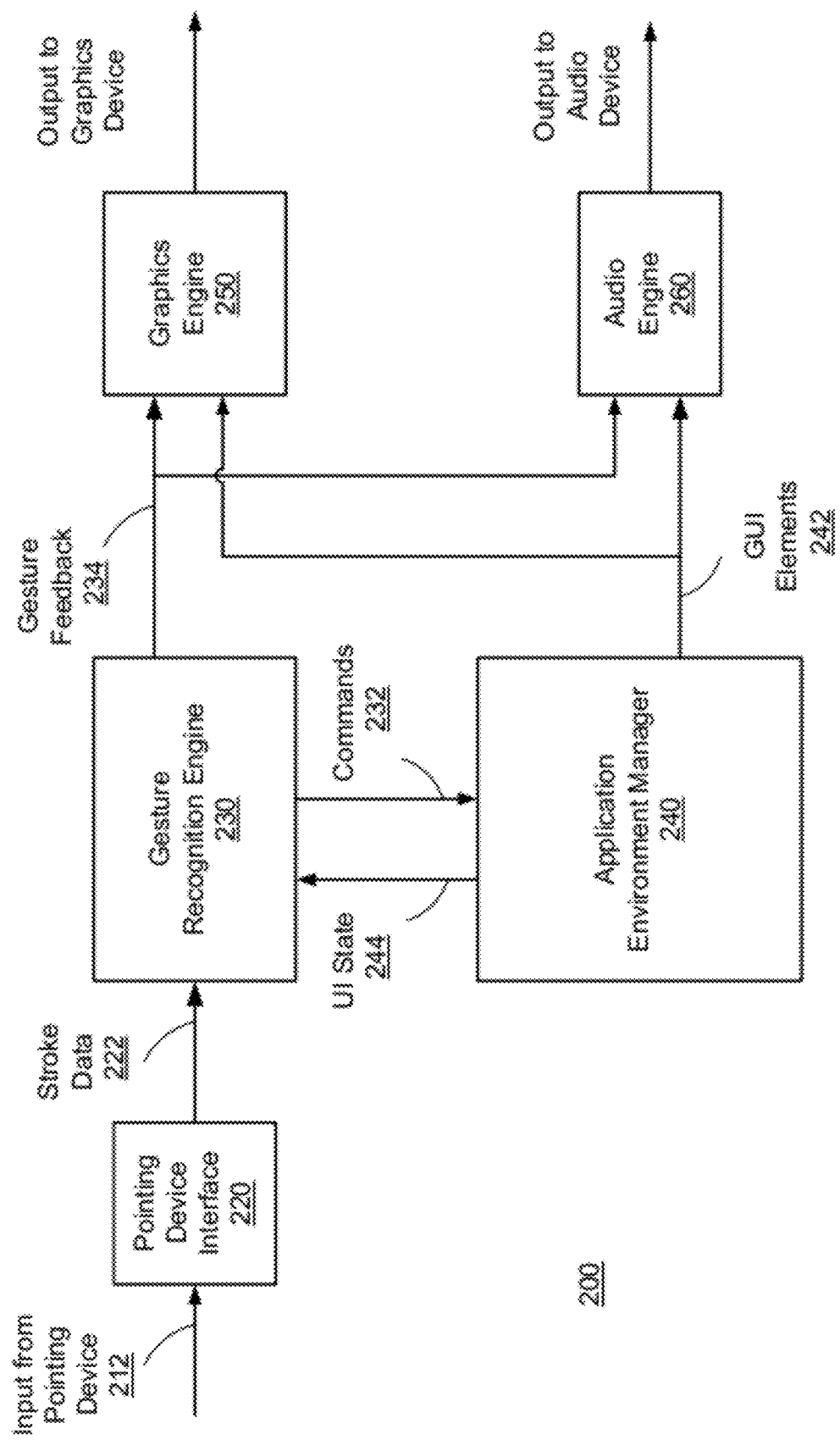
FIG. 2 is a block diagram illustrating a system for touch-based annotation according to one embodiment of the present invention.

The present invention has been described as containing a number of embodiments thereof, in terms of the characteristics of the user interface elements, annotation invocation and annotation control. Each of these embodiments may be implemented in an annotation system that operates in conjunction with a suitable input mechanism and display device. FIG. 2 is a block diagram illustrating one such a system 200 that can be configure to provide the functionality described herein. System 200 includes a number of components, which may represent separate hardware modules and/or software modules, as would be appreciated by those of ordinary skill in the art.

As shown in FIG. 2, system 200 comprises a pointing device interface 220, a gesture recognition engine 230, an application environment manager 240, a graphics engine 250, and an audio engine 260. Pointing device interface 220 receives stroke input from one or more pointing devices 212, (e.g., a gesture input from a touch screen), each of which may report one or more point inputs. Pointing device interface 220 supplies the stroke data 222 to gesture recognition engine 230, which records and analyzes the shape and characteristics of the incoming strokes. Gesture recognition engine 230 determines if the input stroke corresponds to an invoking pattern. If the input corresponds to such a pattern, which means an invocation pattern is successfully recognized, gesture recognition engine 230 then transmits a command 232 to application environment manager 240, which manages application elements and invoke the appropriate menu or contextual response. Details of such a multi-touch system is described in patent application PCT/US2008/071548 filed on 30 Jul. 2008, the disclosure of which is incorporated herein by reference. Details of such a touch screen display is described in patent application Ser. No. 12/687,828 filed on 14 Jan. 2010, the disclosure of which is incorporated herein by reference.

Application environment manager 240 may manage a wide variety of application-specific component objects that are controlled by and interact with one or more users. To represent the application elements to the user, application environment manager 240 maintains a collection of graphical user interface (GUI) elements 242, which are supplied to graphics engine 250 for rendering graphics on the graphics device and/or an audio engine 260 to output audio. Application environment manager 240 may also submit UI state information 244 to gesture recognition engine 230 to modify or enhance the capabilities of gesture recognition engine 230. It may also improve the system performance for gesture recognition engine 230 to provide audio/visual gesture feedback 234 to graphics engine 250 and audio engine 260 in addition to the GUI feedback provided by the application.

In one embodiment, system 200 is configured to provide the user interface elements, annotation invocation and annotation control described herein. For example, gesture recognition engine 230 is configured to recognize gestures for invoking annotation canvas, for inputting annotations, and for selecting the annotation controls. Gesture recognition engine 230 also transmits corresponding commands to application environment manager 240, which performs appropriate functions, such as instantiating the annotation canvas 110 and creating an annotation 112. Application environment manager 240 then instructs graphics engine 250 to render the output on the display.

Annotation Canvas Process

Figure 3:
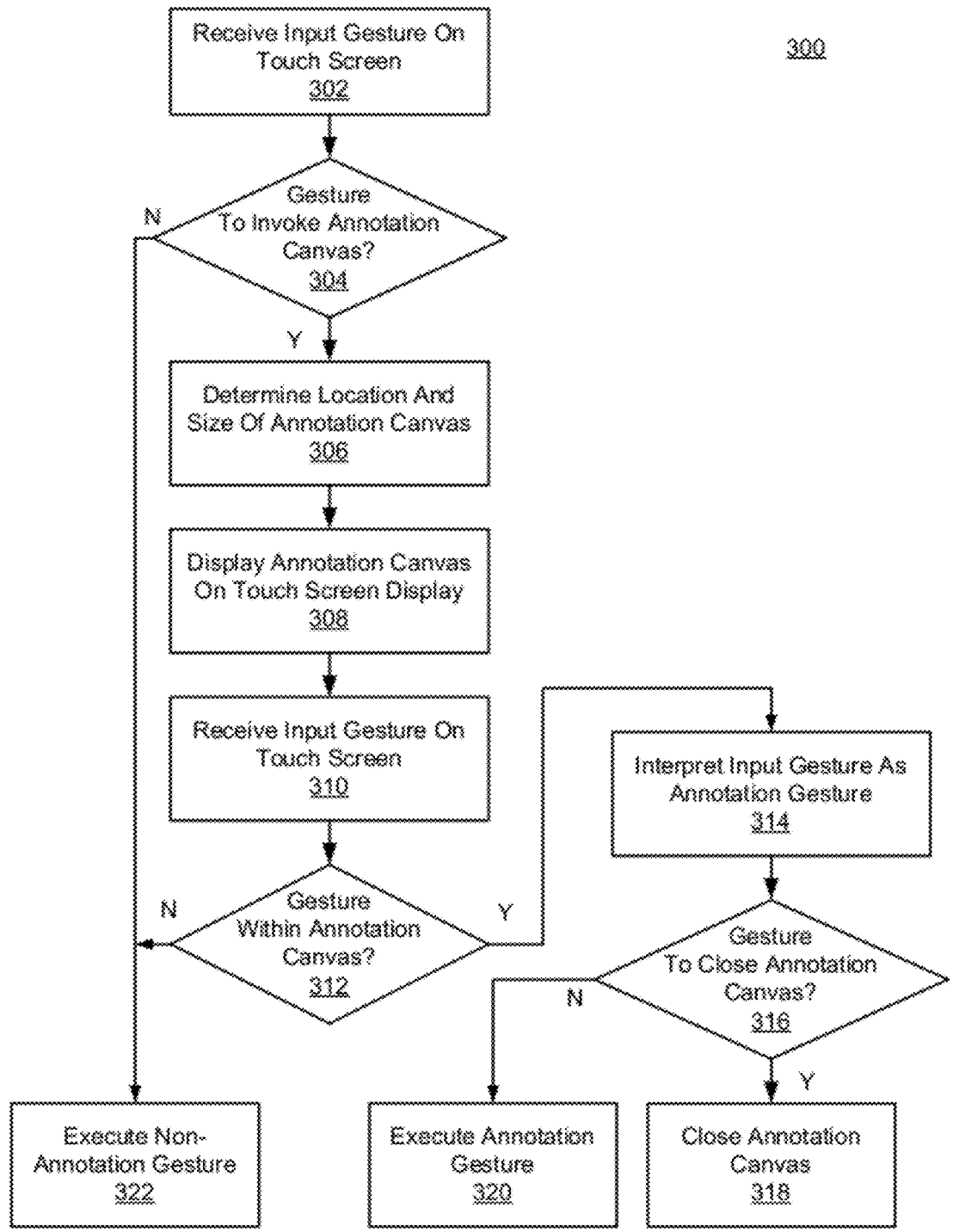
FIG. 3 is a flow chart illustrating a method of touch-based annotation according to one embodiment of the present invention.

FIG. 3 is a flow chart illustrating one embodiment of method for providing touch-based annotation. The touch screen system receives 302 an input gesture from a touch screen from a user. The system then analyzes the shape and characteristics of the gesture to determine 304 whether the gesture is to invoke an annotation canvas. In response to the gesture not being an invocation of an annotation canvas, the non-annotation function or operation associated with the gesture is executed 322. On the other hand, in response to the invocation gesture being recognized, the system determines 306 the location and size (e.g., height and width) of the annotation canvas. In one embodiment, the size of the annotation canvas can be decided by the system automatically to accommodate both of the user's hands for easy access. Alternatively, the annotation canvas can be initiated to a preconfigured size, as described above.

Next, the system displays 308 the annotation canvas on the touch screen display. Different visual effects may be used to indicate the area of annotation canvas, for example, an annotation canvas can be outlined by a colored border, a semi-transparent overlay, or both. At this point, the annotation canvas is displayed on the touch screen, and the system continues to monitor inputs on the touch screen. Once receiving 310 a next input gesture, the system examines it to determine 312 whether the gesture positioned within the annotation canvas. If the gesture is detected within the canvas area, the system interprets 314 the gesture as annotation related and determines 316 if the gesture is to close the annotation canvas. If so, the system closes 318 the annotation canvas; otherwise, the system executes 320 the annotation function associated with the gesture, which includes making an annotation and selecting an annotation control. If the gesture is entered outside annotation canvas, the system executes the gesture as a non-annotation function, which includes both navigation inputs and other application specific non-navigation inputs, as described above.

Generalized Temporary Modes

The present invention has been described so far as containing a number of embodiments thereof, facilitating a touch screen system to display an annotation canvas, which is a local region for a user to make annotations. However, the functionality provided by the local region is not limited to this specific case of the annotation canvas. The local region or canvas can be generalized to function in any temporary local input modes initiated by predefined gestures. The temporary modes for a local canvas include, but not limited to, annotation, drawing, alphanumeric data entry, and navigation. The functionality supported by the temporary modes may be built-in by the system (e.g., navigation), or by external applications (e.g., a third-party photo editing application).

For example, a local canvas may support a graphics application by the touch screen system. Various chorded gestures using one hand can be associated with for different functions and tools in the graphics application, such as paintbrush, freeform selection, drawing shapes, and image manipulation (e.g. dodge and burn, flood fill, crop, resize, etc.). The user can switch between such functions and tools by entering corresponding chorded gestures with one hand, while performing the operations with the other hand. The local canvas also supports multiple users. For example, in the graphics application, one user may be painting in the background of the canvas, and another person starts to increase the brightness of the foreground in a different part of the canvas.

Similar to the annotation canvas, multiple local regions or canvases with temporary modes can be invoked over the graphical space on the touch screen. For instance, local regions can be created for navigation, drawing, moving, and deforming parts. Multiple canvases for generalized modes would work as long as the underlying global graphical space shared by all the users is not changed by any other users, so that the local view of objects, location on map, and page of document remain the same for each canvas.

A conflicting situation arises when one user tries to move, pan, and zoom the graphical space in the multi-user environment. To prevent such a conflict, in one embodiment, navigation gesture inputs are prohibited during an annotation action. However, when multiple users are busy working on their local canvases, the lock would prevent any global navigation from happening. To mitigate the locking, in another embodiment, when one of the users switches to a navigation mode, the system automatically splits the graphical space into multiple sub-spaces, the boundaries of which are determined by sub-dividing (e.g., bisecting) the distance between the edges of the canvas areas. For example, if two users with local canvases are working on the touch screen, two sub-spaces, with a dividing line halfway between the respective control panels can be created. This allows one user to continue annotating in one sub-space, and the other user to navigate in the other sub-space, thus, creating two views of the underlying graphical space. The global graphical space can be restored after one of the local sub-spaces is closed. Other algorithms may also apply for the splitting.

Exemplary Computer System

Figure 4:
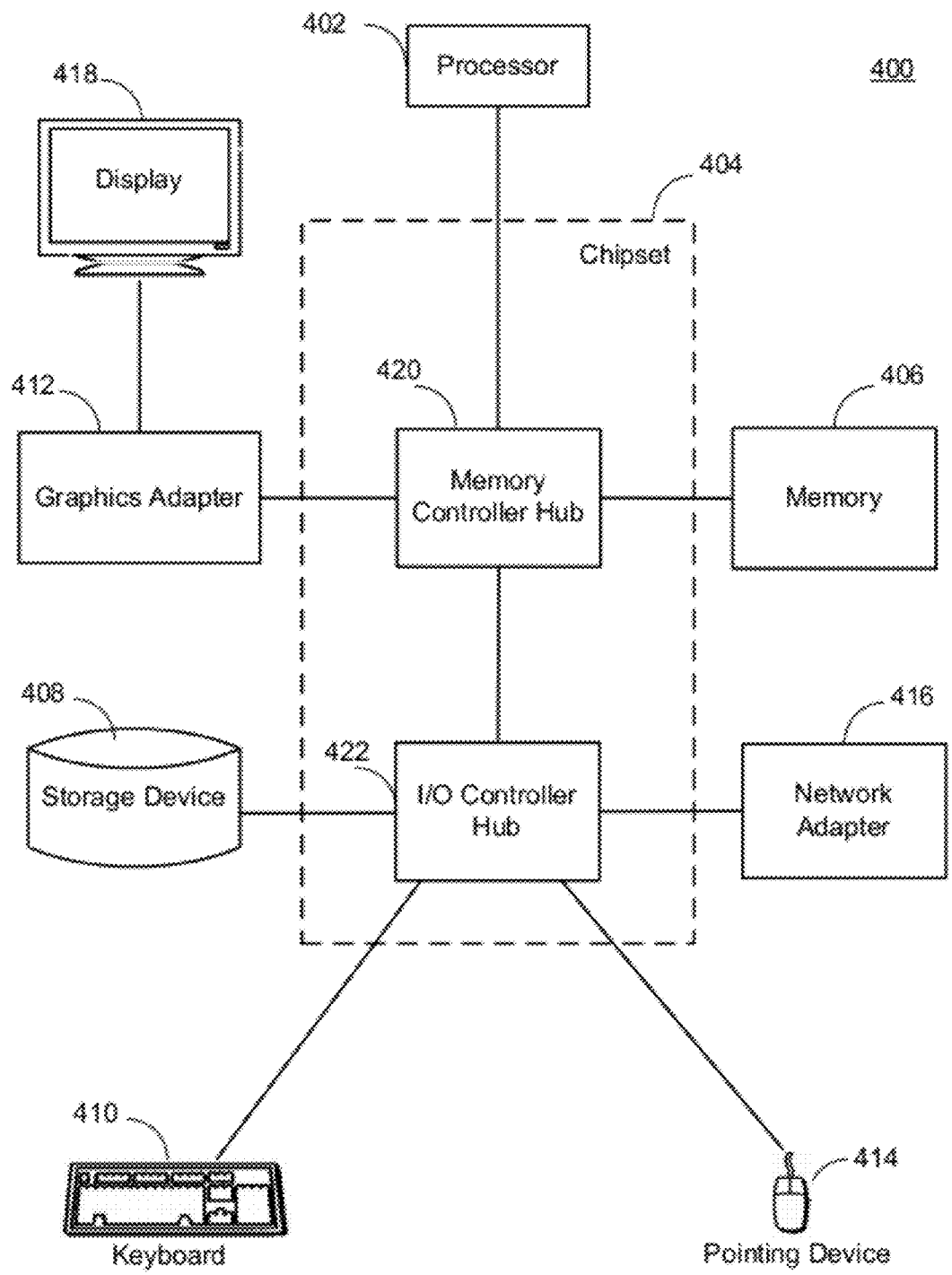
FIG. 4 is a block diagram illustrating an exemplary computer system in which the present invention may be realized.

FIG. 4 is a high-level block diagram of a computer 400 for acting as a system for touch-based annotation 200 according to one embodiment. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer system 400. The graphics adapter 412 displays images and other information on the display 418. The display 418 may be a touch screen 100 which supports annotation canvas functions. The network adapter 416 couples the computer system 400 to a local or wide area network.

As is known in the art, a computer 400 can have different and/or other components than those shown in FIG. 4. In addition, the computer 400 can lack certain illustrated components. In one embodiment, a computer 400 acting as a touch-based annotation system 200 lacks a keyboard 410, and/or pointing device 414. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

What is claimed is:

1. A computer implemented method of processing a gesture input on a touch screen display device, the method comprising:
    in response to receiving an invocation gesture on a touch screen display of the touch screen display device, displaying the annotation canvas as at least a partially transparent overlay on the touch screen display;
    receiving an input gesture on the touch screen display;
    when the input gesture is detected within the annotation canvas, interpreting the input gesture as an annotation gesture for inputting an annotation, and executing an annotation function associated with the input gesture within the annotation canvas based on the received annotation gesture;
    when the same input gesture is detected outside of the annotation canvas, interpreting the input gesture as a navigation gesture for moving an underlying graphical space to relocate the annotation canvas, and moving the underlying graphical space to relocate the annotation canvas, and
    displaying the annotation canvas on the touch screen display so long as the user's touch associated with the invocation gesture is maintained on the touch screen display, and stopping the display of the annotation canvas when the user's touch associated with the invocation gesture is removed from the touch screen display.

2. A computer implemented method of claim 1, further comprising:
    determining a first location on the touch screen display at which the gesture invoking the annotation canvas is received by one hand of the user;
    determining a second location corresponding to the location of the other hand of the user on the touch screen display; and
    determining the width of the annotation canvas based on a distance between the first location and the second location.

3. A computer implemented method of claim 1, wherein responsive to receiving the input gesture outside of the annotation canvas, interpreting the gesture outside of the annotation canvas as a navigation input further comprises:
    blocking execution of the navigation input while the annotation gesture is being received and executed within the annotation canvas.

4. A computer implemented method of claim 1, wherein responsive to receiving the input gesture within the annotation canvas, the method further comprises:
    expanding an area of the annotation canvas towards the input gesture in response to the gesture being near a border of the canvas.

5. A computer implemented method of claim 1, further comprising:
    displaying an annotation control panel comprising a plurality of annotation controls, each annotation control for configuring a parameter of an annotation to be input into the annotation canvas.

6. A touch screen display apparatus, comprising:
    a touch screen display configured to receive multiple concurrent touch inputs;
    a memory configured to store application data and gesture data;
    a processor configured to perform a method comprising:
        in response to receiving an invocation gesture on a touch screen display of the touch screen display device, displaying the annotation canvas as at least a partially transparent overlay on the touch screen display;
        receiving an input gesture on the touch screen display;
        when the input gesture is detected within the annotation canvas,
            interpreting the input gesture as an annotation gesture for inputting an annotation, and executing an annotation function associated with the input gesture within the annotation canvas based on the received annotation gesture;
        when the same input gesture is detected outside of the annotation canvas, interpreting the input gesture as a navigation gesture for moving an underlying graphical space to relocate the annotation canvas, and moving the underlying graphical space to relocate the annotation canvas, and
        displaying the annotation canvas on the touch screen display so long as the user's touch associated with the invocation gesture is maintained on the touch screen display, and stopping the display of the annotation canvas when the user's touch associated with the invocation gesture is removed from the touch screen display.

7. A touch screen display apparatus of claim 6, further comprising:
    determining a first location on the touch screen display at which the gesture invoking the annotation canvas is received by one hand of the user;
    determining a second location corresponding to the location of the other hand of the user on the touch screen display; and
    determining the width of the annotation canvas based on a distance between the first location and the second location.

8. A touch screen display apparatus of claim 6, wherein responsive to receiving the input gesture outside of the annotation canvas, interpreting the gesture outside of the annotation canvas as the navigation input further comprises:
    blocking execution of the navigation input while the annotation gesture is being received and executed within the annotation canvas.

9. A touch screen display apparatus of claim 6, wherein responsive to receiving the input gesture within the annotation canvas, the method further comprises:
    expanding an area of the annotation canvas towards the input gesture in response to the gesture being near a border of the canvas.

10. A touch screen display apparatus of claim 6, wherein the method further comprises:
    displaying an annotation control panel comprising a plurality of annotation controls, each annotation control for configuring a parameter of an annotation to be input into the annotation canvas.

11. A computer implemented method of processing a gesture input on a touch screen display device, the method comprising:
    in response to receiving an invocation gesture on a touch screen display of the touch screen display device, displaying a local region associated with an input mode as at least a partially transparent overlay on a touch screen display of the touch screen display device;
    receiving an input gesture on the touch screen display;
    when the input gesture is detected within the local region, interpreting the input gesture as an input for the input mode and executing an annotation function associated with the input gesture within the local region based on the received input for the input mode;
    when the same input gesture is detected outside of the local region, interpreting the input gesture as a navigation gesture for moving an underlying graphical space to relocate the local region, and moving the underlying graphical space to relocate the local region, and displaying the local region on the touch screen display so long as the user's touch associated with the invocation gesture is maintained on the touch screen display, and stopping the display of the local region when the user's touch associated with the invocation gesture is removed from the touch screen display.

12. A touch screen display apparatus, comprising:

a touch screen display configured to receive multiple concurrent touch inputs;

a memory configured to store an application data and gesture data;

a processor configured to perform a method comprising:

in response to receiving an invocation gesture on the touch screen display, displaying a local region associated with an input mode as at least a partially transparent overlay on the touch screen display;

receiving an input gesture on the touch screen display;

when the input gesture is detected within the local region,
interpreting the input gesture as an input for the input mode and
executing an annotation function associated with the input gesture within the local region based on the received input for the input mode;

when the same input gesture is detected outside of the local region,
interpreting the input gesture as a navigation gesture for moving an underlying graphical space to relocate the local region, and moving the underlying graphical space to relocate the local region, and
displaying the local region on the touch screen display so long as the user's touch associated with the invocation gesture is maintained on the touch screen display, and stopping the display of the local region when the user's touch associated with the invocation gesture is removed from the touch screen display.

* * * * *